United States Patent [19]
Dorman

[11] 4,345,442
[45] Aug. 24, 1982

[54] CONTROL SYSTEM FOR RESONANT FREE-PISTON VARIABLE STROKE COMPRESSOR FOR LOAD-FOLLOWING ELECTRIC HEAT PUMPS AND THE LIKE

[75] Inventor: Richard A. Dorman, Troy, N.Y.

[73] Assignee: Mechanical Technology Incorporated, Latham, N.Y.

[21] Appl. No.: 160,306

[22] Filed: Jun. 17, 1980

[51] Int. Cl.[3] .......................... F25B 13/00; F04B 49/06
[52] U.S. Cl. ........................................ 62/160; 62/228; 417/44; 417/418
[58] Field of Search ...................... 62/160, 228 B, 215; 417/418, 42, 417, 44, 45

[56] References Cited

U.S. PATENT DOCUMENTS

| | | | |
|---|---|---|---|
| 3,303,990 | 2/1967 | Curwen | 417/418 X |
| 3,781,140 | 12/1973 | Gladden | 417/417 X |
| 3,937,600 | 2/1976 | White | 417/418 X |

*Primary Examiner*—William E. Wayner
*Attorney, Agent, or Firm*—Joseph V. Claeys

[57] ABSTRACT

A control system for controlling the operation of a reciprocating resonant free-piston variable stroke compressor of the type driven by electrodynamic linear motors wherein the spring-mass system of the compressor which is forced into vibration by the linear motor, is arranged to have a selectively variable mechanical resonant frequency generally centered on the power line frequency of the alternating current power source used to drive the linear motor. The control system provided by this invention variably controls the opening and closing of a gas spring control valve that in turn regulates the pressure of gas filled volumes selectively connected to a manifold vented by the valve. The volumes comprise the resilient gas springs for the resonant piston compressor. For this purpose, the control system comprises an alternating current sensor for deriving a sensed output signal representative of the magnitude and phase of the alternating current supplied to the linear reciprocating motor, a reciprocating piston displacement/velocity sensor for deriving a signal representative of the reciprocating free piston velocity, and an $\alpha$ angle detector responsive to the signal from the alternating current sensor and the piston velocity signal from the piston displacement/velocity sensor for comparing the phase of the alternating current supplied to the linear reciprocating motor to the reciprocating free resonant piston displacement/velocity and deriving an output $\alpha$ angle control signal that then is supplied to an RPC control logic circuit for the RCP heat pump. The RPC control logic circuit derives motor voltage control relays for controlling the supply voltage valve to the A-C coils of the linear motor.

8 Claims, 6 Drawing Figures

CONTROL SYSTEM FOR RESONANT FREE-PISTON VARIABLE STROKE COMPRESSOR FOR LOAD-FOLLOWING ELECTRIC HEAT PUMPS AND THE LIKE

BACKGROUND OF INVENTION

1. Field of Invention

This invention relates to a new and improved control system for a resonant free-piston, variable stroke compressor and for a heat pump utilizing such compressor.

More particularly, the invention relates to a control system for controlling automatically the operation of a mechanical resonant free-piston compressor driven by an electrodynamic linear reciprocating motor. The spring-mass system of the resonant free piston compressor (RPC) which is forced into vibration by the linear motor, is designed to have a selectively variable mechanical resonant frequency generally centered on the power line frequency of the alternating current (A.C.) power source used to drive the linear reciprocating motor. The RPC may also include means responsive to any over-stroking of the piston which are operative to vary the natural frequency of the spring-mass system by varying the stiffness of resilient gas springs provided in the RPC.

2. Background of Invention

A controlled stroke, resonant free-piston compressor employing an electrodynamic linear motor is described and claimed in U.S. Pat. No. 3,937,600 issued Feb. 10, 1976, Harlan V. White—Inventor—entitled "Controlled Stroke Electrodynamic Linear Compressor". An improvement in that compressor is described in copending U.S. application Ser. No. 160,429 (HD-5454). Peter W. Curwen and Richard A. Dorman, Inventors filed concurrently with this application, entitled "Resonant Piston Compressor Having Improved Stroke Control", and in U.S. Pat. No. 4,067,667 for a "Controlled Stroke Electrodynamic Oscillating Motor Compressor", Harlan V. White—Inventor all assigned to Mechanical Technology, Incorporated of Latham, New York. The disclosures of each of these prior art reference United States patents and copending application, are hereby incorporated in their entirety into this application.

RPC heat pumps, for the purposes of this disclosure, are defined as load-following (or modulating) heat pumps where the words "load-following" or "modulating" mean that the output heating or cooling capacity of the heat pump is varied in a continuous manner so that its output capacity matches the actual heating/cooling load requirement. For example, if the load is a single-family residence where the heating or cooling requirements vary as a function of outdoor weather conditions, the heating or cooling capacity of an RPC heat pump automatically will be smoothly varied (modulated) to maintain the temperature of the house at a desired temperature set by a thermostat control within the house. As a consequence of its load-following operating characteristics, the RPC heat pump will operate more or less continuously. This is in sharp contrast to the on-off cycling type of operation characteristic of most currently available (non-modulating) heat pumps. It has been determined, as a result of the above briefly described experience, that the modulating mode type of heat pump operation is more energy efficient than on-off cycling and can result in significant kilowatt-hour savings (operating cost savings) for the heat pump owner.

The RPC heat pump modulating capability is attained by means of a unique linear reciprocating motor-driven resonant free-piston compressor. To obtain variable capacity operation, the displacement of the RPC is changed by changing or varying piston stroke, hereinafter referred to as stroke modulation.

Studies indicate that by providing a control capability for finely adjusting piston stroke (fine stroke modulation), RPC-equipped heat pumps should yield significant energy savings and fast pay back of installed cost premiums. Compared to the best residential heat pumps currently available (those heat pumps with constant-displacement compression operating in an on-off cycling mode), the advantages of a stroke modulation RPC heat pump predictably are as follows: a 19–34% reduction in annual operating costs for the owner, depending upon geographic location; a 2.2 years or less pay back time on installed costs premium, again depending upon geographic location; higher inherent reliability resulting from (1) RPC tolerance to liquid refrigerant flood back, and (2) greatly reduced number of heat pump on-off and defrost cycles as a consequence of modulation, and lower maintenance and repair costs due to reduced stress as a consequence of the stroke modulation control technique in contrast to the higher stress on-off cycling of conventional heat pump components.

In order to take full advantage of the stroke-modulation capability inherent in the RPC devices described in the above-listed patents, it was necessary to provide some means for better controlling (modulating) the resonant free-piston stroke whereby finer control over displacement of the compressor and its operation in a heat pump system, could be maintained. For this purpose, the present invention was devised.

SUMMARY OF INVENTION

It is therefore a primary object of the present invention to provide a new and improved control system for a resonant free-piston, variable stroke compressor and for a heat pump utilizing such compressor.

Another object of the invention is to provide a new and improved control system for controlling automatically the stroke modulation of a mechanical resonant free-piston compressor driven by an electrodynamic linear reciprocating motor. The spring-mass system of the resonant free-piston compressor which is forced into vibration by the linear motor, is designed to have a selectively variable mechanical resonant frequency generally centered on the power line frequency of the alternating current power source used to drive the linear motor. The RPC may also include means responsive to any over-stroking of the compressor piston which are operative to vary the natural frequency of the spring-mass system by varying the stiffness of resilient gas springs to thereby prevent over-stroking.

Still another object of the invention is to provide a new and improved RPC control system which is suitable for incorporation in an overall heat pump control system, and the provision of an overall heat pump control system employing a novel RPC control having improved compressor piston stroke modulating capabilities.

A feature of the invention is the provision of a resonant free-piston compressor control system including alternating current sensing means for deriving a sensed signal representative of the magnitude and phase of the alternating current supplied to the linear reciprocating motor of the RCP, a resonant piston displacement-/velocity sensor for deriving a signal representative of the compressor piston velocity, an $\alpha$ angle detector responsive to the output from the alternating current sensor and from the compressor piston displacement-/velocity sensor. As used herein "$\alpha$ angle" means the phase angle between the first harmonic component of the alternating current and piston velocity wave forms. The $\alpha$ angle detector compares the phase of the alternating current supplied to the linear reciprocating motor to the piston displacement/velocity and derives an output $\alpha$ angle control signal representative of the magnitude of the phase angle $\alpha$. The control system further includes means for effectively applying the house temperature or other error signal to a gas spring control valve for controlling the stiffness of the resilient gas springs of the resonant free-piston compressor to thereby supply the heating and cooling or other load requirement of the conditioned space of the house, or the like.

Another feature of the invention is the provision of a control system for an RPC wherein the linear reciprocating electrodynamic motor includes A.C. windings and direct current field windings and the control system further includes A.C. voltage control means for controlling the magnitude of the A.C. voltage supplied to the A.C. windings, A.C. current detector means responsive to the output from the A.C. sensing means for deriving an output feedback signal representative of the magnitude of the A.C. current, the output from the A.C. detector being supplied to an RPC control logic circuit for deriving a direct current controlling signal proportional to the magnitude of the A.C. current and a direct current control and supply circuit means having its output coupled to the direct current field winding of the reciprocating linear motor and controlled by the output direct current control signal derived from the RPC logic circuit for proportionally controlling the magnitude of the direct current supplied to the linear reciprocating motor direct current field winding in proportion to the current magnitude of the A.C. supplied to the A.C. winding of the linear reciprocating motor.

A further feature of the invention is the provision in the control system of a two-level voltage supply relay circuit for controlling the magnitude of the supply A.C. voltage to the linear reciprocating motor. The motor voltage relay circuit is controlled by the RPC control logic circuit in response to the output from the $\alpha$ angle detector whereby the magnitude of the A.C. supply voltage to the linear reciprocating motor is switched from a 115 volts rms value to a 230 volt rms value upon the $\alpha$ angle of the RPC obtaining a predetermined negative (lagging) condition where the natural mechanical system resonant frequency is lower than the A.C. supply voltage frequency and for switching the A.C. voltage to the linear reciprocating motor from a 230 volt rms value to a 115 volt rms value in response to the $\alpha$ angle obtaining a predetermined positive (leading) value relative to the A.C. supply voltage frequency. A still further feature of the invention is the provision of a two-level stroke limit detector circuit together with a motor temperature sensing circuit with the output of both the stroke limit and motor temperature detector circuit being supplied to the RPC logic circuit means for automatically alarming and/or shutting down the RPC in the event that either the compressor piston stroke exceeds the alarm and/or shut down levels or the linear motor temperature exceeds a predetermined safe limit value.

A still further feature of the invention is the provision of an overall control system for a RPC heat pump unit including heat exchangers, circulating fans, space temperature sensors, thermostats and a central control unit for an overall heat pump apparatus which supplies an output control point reference signal to the RPC logic control unit whereby modulation of the RPC piston is finely controlled to meet the heating/cooling load demands of the heat pump within safe limits of operation for the RPC.

BRIEF DESCRIPTION OF DRAWINGS

These and other objects, features and many of the attendant advantages of the present invention will be better understood from a reading of the following detailed description when considered in connection with the accompanying drawings, wherein like parts in each of the several figures are identified by the same reference character, and wherein.

DETAILED DESCRIPTION OF PREFERRED EMBODIMENT

Figure 1:
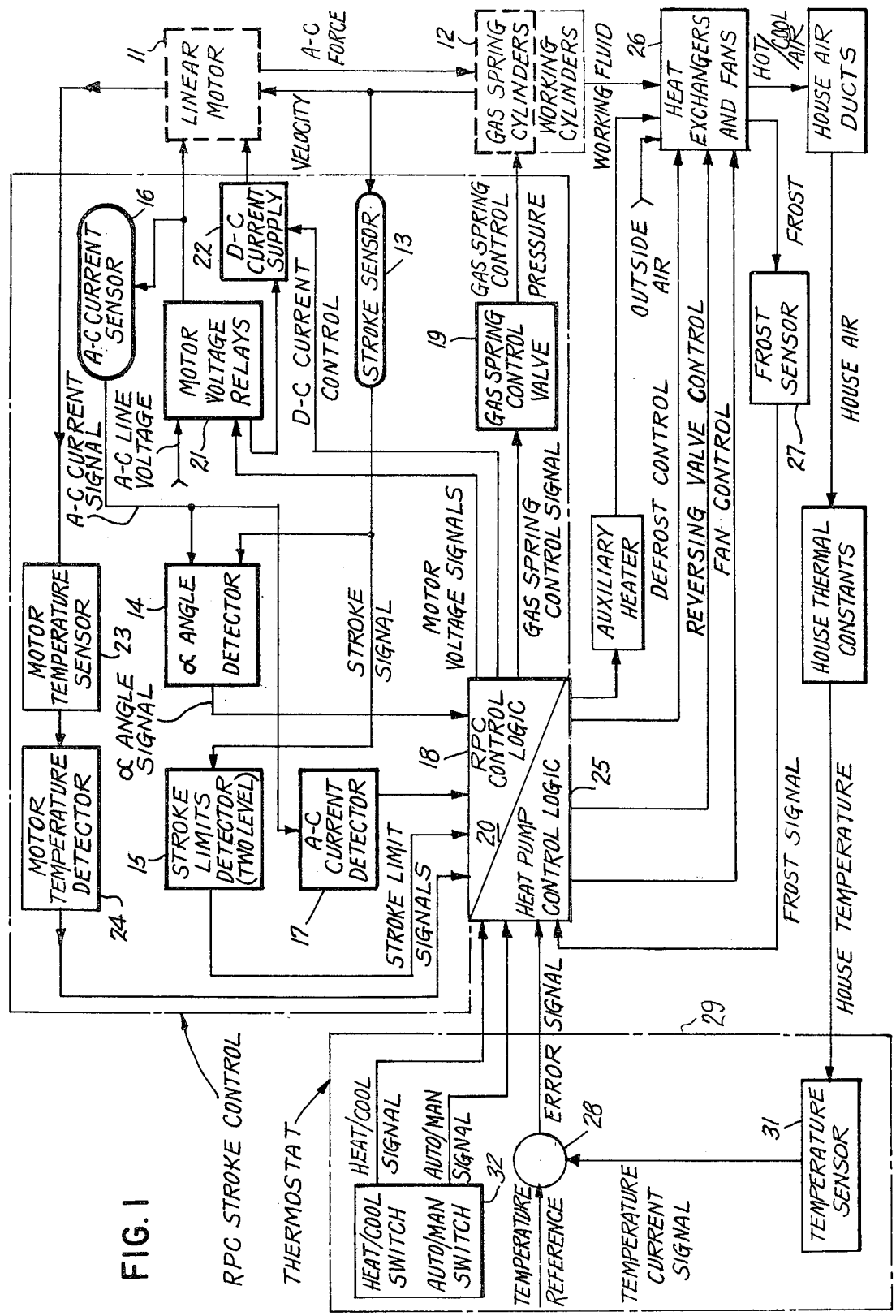
FIG. 1 is a detailed functional block diagram of an RPC heat pump control system with emphasis on the RPC controls.

FIG. 1 is a detailed functional block diagram of a new and improved resonant piston compressor control system according to the invention and shows the RPC control system used in conjunction with and comprising a part of an overall heat pump apparatus control system. In FIG. 1 the resonant piston compressor is indicated in part by the dotted outline blocks 11 representing an electrodynamic linear reciprocating motor having both alternating current windings and direct current field windings. As explained more fully in U.S. Pat. No. 3,937,600, linear motor 11 includes a linearly movable reciprocating armature (not shown in FIG. 1) which is directly coupled to and drives a pair of opposed pistons which reciprocate within selectively valved working cylinders substantially in synchronism with the frequency of the AC power source employed to drive linear motor 11. Enclosed volumes of gas acting as resilient gas spring means shown generally by the dotted outlined box 12 coact with the reciprocating pistons and with the linear motor 11 to form a mechanical resonanat spring-mass system which is forced into vibration by the linear motor at essentially the AC power line frequency. The resonant piston compressor (RPC) includes means responsive to any over-stroking of the piston for varying the natural frequency of the spring-mass resonant piston system by varying the stiffness of the enclosed volumes of gas comprising the resilient gas spring means located at opposite ends of the resonant free piston stroke as described more fully in the above-referenced U.S. Pat. No. 3,937,600. For this purpose means are provided which are responsive to the position (velocity) of the free resonant piston for controlling the force output of the linear motor to thereby provide stable operation over varying compressor load conditions by varying the resonant frequency of the mechanical resonant system. This means includes a stroke sensor shown at 13 which in effect derives an output electric signal representative of the displacement/velocity of the resonant piston and supplies this signal as one input to an α angle detector 14 and to a stroke limits detector 15. The function of the α angle detector 14 and stroke limits detector 15 will be explained more fully hereinafter. Using the piston stroke velocity signal in conjunction with an AC current signal obtained from an AC current sensor 16 whose output is supplied to a second input of the α angle detector 14 and to an input of an AC current detector 17 (the purpose of which will be described more fully hereafter), the α angle detector 14 derives an output α angle control signal that then is supplied to an RPC control logic circuit shown as the right upper triangular portion of a main controller 20 for the RPC heat pump. The RPC control logic circuuit 18 then derives motor voltage control signals that are supplied to the motor voltage control relays shown at 21 for controlling the voltage value to the A-C coils in the linear motor 11. It will be appreciated that the block diagram of FIG. 1 illustrates a closed loop feedback system for controlling operation of a heat pump and which constitutes the main operating control for the RPC so as to provide stable operation over varying compressor load conditions. For this purpose, the heat pump temperature control supplies a temperature related error signal via an RPC control logic circuit to control a gas spring control valve for increasing the resonant frequency of the spring-piston mass system by increasing the stiffness of the resilient gas spring to produce a decreasing piston stroke, and decreasing the resonant frequency of the spring-piston mass system by decreasing the stiffness of the resilient gas springs to produce an increasing piston stroke.

During operation of the RPC, the natural (resonant) frequency of the RPC spring-mass system is changed with respect to the frequency of the AC voltage applied to the linear motor. This permits the smallest possible motor to be designed since, at resonance, the motor is not required to supply the large acceleration forces required to sustain reciprocating motion of the armature-piston assembly. The acceleration forces are provided mainly by the resilient gas-spring cylinders, with a smaller contribution by the working cylinders of the compressor. The phase angle α is the phase shift between the motor AC current and the motor back EMF. This same phase angle exists in the RPC spring-mass system and represents the phase shift between the electromagnetic force acting on the motor armature-piston and the piston velocity. When the natural (resonant) frequency of the RPC and the frequency of the AC voltage applied to the linear motor are equal, phase angle α is zero. When the forced vibration frequency is higher than the AC voltage frequency, the angle α is positive and is said to be leading. When the forced vibration frequency of the spring-piston mass system is lower than the AC voltage frequency, the α angle is negative and is said to be lagging. Bu changing or varying the phase angle α, the resonant tuning of the RPC spring-mass system is changed. It is by this principle that the RPC derives its unique capability to modulate output heating or cooling capacity by appropriately changing (modulating) the length of the piston stroke. As explained more fully in U.S. Pat. No. 3,937,600 referenced above, at col. 5, line 53 thru col. 6, line 18, in particular with relation to FIGS. 7 and 8 of that patent, the piston velocity and driving force (electromagnetic force) are in phase at resonance (i.e. the frequency of the RPC piston and the frequency of the A.C. supply voltage are the same). It is believed to be common knowledge to those skilled in the art that the A.C. supply voltage will vary sinusoidally with time. The RPC piston velocity also varies sinusoidally with time as shown at A in FIG. 8 of U.S. Pat. No. 3,937,600. Keeping in mind the above set forth observation that the same phase angle α represents the phase shift between the electromotive force acting on the linear motor armature-piston and the piston velocity, it is believed obvious to one of ordinary skill in the art that by sensing the A.C. current and comparing it in a phase comparator to the sensed RPC piston velocity, a measure of the phase angle α can be derived. By adjusting the stiffness of the gas-spring cylinders in a controlled manner, the resonant tuning of the RPC relative to the electrical frequency can be changed. This causes phase angle α and thus the motor power to change, and in turn causes piston stroke and hence output capacity of the RPC to change.

The natural frequency of the RPC spring-mass system is established by the combined stiffness characteristics of the gas-spring volumes and the working cylinders. In addition to providing the stiffness change needed to effect stroke modulation, the gas-spring cylinders must also compensate for changes in working cylinder stiffness that can result from changes in compressor suction and/or discharge pressure as a consequence of changes in outdoor and indoor temperatures and pressures.

Gas spring stiffness control is accomplished by an internal control arrangement whereby as the piston assembly moves through its midstroke (centered) position, a passive porting arrangement integral with each of the gas spring volume cylinders, momentarily communicates each cylinder to a common manifold. This arrangement is explained more fully in copending U.S. application Ser. No. 160,429 listed earlier, and reference is made to that application for a more detailed description of this feature. The porting action described in the preceeding sentence occurs twice per piston plunger cycle and forces the midstroke pressure within the gas-spring volume cylinders to be essentially equal to the manifold pressure and to equalize the pressure in the respective gas-spring volume cylinders to the manifold pressure. By externally adjusting the manifold pressure via the gas spring controlled valve 19, the pressure level (and hence stiffness) of the gas-spring volume cylinders can be adjusted to achieve the required level of motor power and hence compressor capacity. Thus, it will be appreciated that the gas spring control valve 19, which is under control of a gas spring control signal derived from the RPC control logic 18 that in turn derives its output from an input house temperature error signal from comparitor block 28 and heat pump control logic circuit 25, comprises an integral part of a feedback RPC electronic stroke control system for controlling the compressor output capacity to meet (follow) the load demand.

In conjunction with controlling the output power developed by the RPC by changing the phase angle α via changes in the gas-spring stiffness, the output power of the RPC can be varied in a second way by changing the AC voltage magnitude applied to the linear reciprocating motor 11. Both methods of power control are used in the RPC control system shown in FIG. 1. For this purpose the RPC control logic circuit 18 issues a motor voltage signal that is applied to a set of motor voltage relays 21 of conventional construction. The motor voltage relays 21 serve to couple either a 230 volt rms value AC line voltage or a 115 volt rms AC line voltage to the linear motor 11 in response to the motor voltage control signal supplied thereto from RPC control logic 18. By this means the AC voltage supplied to linear motor 11 is varied in step fashion to either a 115 or 230 volt level depending upon whether low or high power operation is required. This variation in conjunction with the phase angle modulation described above is used to obtain continuous modulation of output power within either the low or high power range.

In addition to the AC current, DC current is supplied to the DC field winding of linear motor 11 from a DC current supply circuit 22 that is obtained by rectifying the 115 volt rms, AC line voltage. The DC current supply circuit 22 is controlled by a DC current control signal supplied thereto from the RPC control logic circuit 18 for proportionally controlling the magnitude of the DC current supplied to the linear motor field windings in proportion to the magnitude of the AC current supplied to the AC field windings of the motor. For this purpose, the DC current supply circuit 22 includes a rectifier and SCR chopper circuit for appropriately controlling the magnitude of the DC current and is described more fully in copending United States patent application Ser. No. 160,305, filed concurrently with this application and entitled "DC Excitation Control of Linear Oscillating Motors" by Howard L. Clark, Richard A. Dorman and Paul Back, also assigned to Mechanical Technology, Incorporated. For a more detailed description of the DC current supply circuit 22 and the manner of its operation reference is made to that copending application. However, for the purpose of the present disclosure it is sufficient to state that the DC current control signal from RPC control logic circuit 18 proportionally controls the magnitude of the DC current supplied to the DC field windings of linear motor 11 in proportion to the magnitude of the AC current supplied to the AC windings of the motor. For this purpose, the AC current sensor 16 supplies its output to the AC current detector circuit 17 that in turn supplies its output to the RPC control logic 18 for use in deriving the desired DC current control signal for proportionally controlling the DC current supplied to the DC field windings of the motor.

In addition to the above-described control loops, the RPC control system further includes safety circuit features which monitor the temperature of the linear reciprocating motor 11 and the length of the stroke of the resonant free piston, and in the event either parameter exceeds certain predetermined limits, the system reduces the output power of the compressor, or in extreme conditions shuts down the compressor entirely and signals the homeowner of the condition. For this purpose, a motor temperature sensor shown at 23 is provided for sensing the temperature of the linear reciprocating motor 11 and supplies its output to a motor temperature detector circuit 24. The motor temperature detector circuit 24 compares the sensed motor temperature to predetermined limit value representing an alarm level and provides output motor temperature control signal to the RPC control logic circuit 18. The RPC control logic circuit 18 then processes the control signal and appropriately either reduces output power of the compressor and signals the homeowner of the condition or alternatively shuts down the compressor by reducing or shutting off the AC motor voltage and DC current control signals. In addition to the motor temperature safety feature, the stroke limits detector circuit 15 which has supplied thereto the output of the stroke sensor 13, compares the magnitude of the stroke of the resonant free piston to predetermined alarm and shut down levels and derives output stroke limit signals for supply to the RPC control logic circuit 18. Logic circuit 18 then processes these signals and in response thereto either reduces the output of the compressor and signals the homeowner of the condition or shuts down the compressor for safety reasons.

The entire RPC control system is designed to function in conjunction with a resonant free piston compressor to operate as a load demand following system for supplying, for example, the heating/cooling load demand of a heat pump unit (as will be described hereinafter) under almost all operating conditions but where response to the load demand would endanger the resonant piston compressor, operation of the RPC is maintained within safe limits by the essentially self-contained RPC control system. The control elements employed in the control system for the modulation of output power of the RPC are divided into three groups; actuating devices, sensors, and transfer function devices. The actuating devices are the interfaces between the control circuit and the RPC. These devices are the gas spring pressure control valve which is described more fully in copending United States application Ser. No. 160,317 filed concurrently with this application and entitled "Resonant Piston Compressor Gas Spring Stiffness Control Valve" by Leo Hoogenboom—Inventor and assigned to Mechanical Technology, Incorporated, the disclosure of which is hereby incorporated into this application in its entirety. The DC current control circuit 22 as noted earlier is described in copending United States application Ser. No. 160,305, now U.S. Pat. No. 4,291,258, and the motor voltage control relays are of conventional construction. The sensors are the interface elements between the RPC and the transfer function devices. Three sensors are used in the RPC control circuit; an AC current sensor, a velocity sensor, and a temperature sensor. These sensors produce output signals proportional to the instantaneous value of the measured parameters. The AC current sensor comprises a current transformer and signal amplifier. The velocity sensor comprises a piezoelectric accelerometer with an internal amplifier for sensing the instantaneous piston velocity by deriving an accelleration signal that is converted to a signal proportional to the relative piston to stator velocity. The motor temperature sensor preferably comprises a voltage ratio circuit for determining the DC winding resistance of the motor DC field windings for determining when the DC winding temperature is above a predetermined limit value. The transfer function devices employed in the control system are the interface circuits between the sensors and the system control elements. Four transfer function devices are used in the control system; the α angle detector circuit, the stroke limit detector, the AC current detector and the motor temperature detector circuit. The RPC control system then is completed by inclusion of the RPC control logic circuit 18 which may comprise a specially designed microprocessor based system of the type manufactured and sold commercially by companys such as Borg Warner Corporation and Honeywell, Inc. for use on controlling heat pumps, air conditioners and similar apparatus.

As described earlier, the actuating devices of the system perform two functions to control the output power from the RPC. These two functions are the gas spring pressure control and control of the voltage applied to the linear motor. The primary control function is the gas spring pressure control. This function provides continuous control of the RPC power output over a wide range of α angle values. Control of the voltage to the linear motor comprises a discrete switching of either 115 of 230 volt rms value AC voltage levels to the linear motor terminals. The two level voltage control is provided so that output power modulation can be performed within the RPC resonant frequency limits as defined by the α angle values over two adjoining power level ranges defined by the 115 volt or 230 volt excitation voltage levels supplied to the linear motor. The third actuating device provided by the DC current control makes it possible to optimize the linear motor efficiency. This control circuit is used to vary the value of the DC current in proportion to the AC current over a complete range of AC current values existing within both the 115 volt and 230 volt excitation voltage ranges.

Signals to all of the actuating devices from the central RPC control logic circuit 18 are in the form of voltage levels. The motor voltage signal is composed of drive levels to turn on one of two relays that apply AC line voltage to the linear motor 11. The signals to the DC current control 22 and the gas spring pressure control valve 13 are logic levels to trigger these devices to perform their operations. In the case of the DC current control, the logic signal controls the amount of rectified AC voltage applied across the DC motor winding. In the case of the gas spring pressure control valve, the logic signal actuates a valve that controls the gas spring enclosed volume pressure by opening or closing the valve to thereby control the flow of gas from the valve to thereby control the flow of gas from the enclosed volumes or cavities that comprise the resilient gas springs.

The function of the sensors and the transfer function devices is to determine the values of certain parameters of the RPC, sense when these values indicate that the parameters are exceeding fixed limits, and indicate to the RPC control logic circuit that action should be taken to either bring the parameters within limits or shut down the RPC. The essential operating parameters being monitored by the sensors and the transfer function devices are; α angle, piston stroke, AC current amplitude and DC motor winding temperature.

The value of the α angle for the RPC is determined by measuring the phase angle between the piston velocity and the motor AC current. The value determined by the α angle detector circuit 14 produces a pulse signal that has a duration and a polarity indicative respectively of the value and the polarity of the α angle. This information is used by the RPC control logic circuit to operate the motor voltage control relays so that the α angle of the RPC is maintained within the range of −40° and +40°. At α = +40° the motor voltage is set to 115 volts if it is not already at that value. At α = −40° the motor voltage is set at 230 volts if it is not already at that value. An alarm is activated if the motor voltage is at 230 volts and α remains at −40° or less and does not supply the conditioned space temperature requirement. The alarm signals the heat pump control logic to activate auxillary heating elements in the system heating mode.

The AC current sensor and the velocity sensor signals are used to perform other functions in addition to α angle detection. The magnitude of the AC current is detected by the AC current detector circuit 17 and this amplitude signal is sent to the RPC control logic circuit 18 to control the DC current value in proportion to the magnitude of the AC current. Magnitude information from the velocity sensor is used to insure that the length of stroke of the piston (and linear motor armature) is within required limits. Peak detection and comparison of the detected velocity signal is achieved in the stroke limits detector circuit 15. The presence of a signal indicating that the piston stroke is at a maximum limit value will cause the RPC control logic circuit 18 to operate the gas spring pressure control valve means 19 in a manner to reduce or limit the stroke. Detection of a minimum stroke limit signal will cause the RPC control logic circuit to remove power from the linear motor after a fixed period of time.

Monitoring of the DC motor winding temperature is performed by monitoring the resistance of the DC motor winding. The monitoring function is performed in the motor temperature detector circuit 24 by sensing the voltage across the DC motor windings and the current through the windings. An over-temperature indication causes the RPC control logic circuit to remove AC and DC power from linear motor 11 for a fixed period of time. In addition, an alarm light on the thermostat will indicate that an over-temperature condition has occurred to the operator of the equipment.

The portions of the RPC control system involved in the modulation of the RPC output power are logic decision functions and control operations. The logic decision functions are based on the status of the α angle, the status of the motor temperature and the interaction of these control signals with the control signals from those portions of a heat pump or other apparatus with which the RPC is used.

In addition to the RPC control system, FIG. 1 of the drawings shows the RPC control system employed as an integral part of an overall heat pump apparatus controller which as a separate heat pump control logic circuit 25 which controls overall operation of the heat pump components including the RPC that supplies working fluid to the heat exchanger 26 of the heat pump unit. The heat pump control logic circuit may comprise a conventional, commercially available microprocessor based control system of the type manufactured and sold by Borg Warner Corporation or Honeywell, Inc. which are specifically designed for use in controlling operation of heat pump units. The heat pump controlling logic circuit 25 in addition to control the heat pump unit components, supplies an input operating set point reference signal to the RPC control logic 18 for coordinating operation of the RPC with the other components of the heat pump unit. In addition, the heat pump control logic circuit 25 supplies a defrost control signal, a reversing valve control signal and a fan signal to the heat exchanger and fans 26 and controls the auxillary heaters. Logic circuit 25 receives back from a frost sensor 27 a frost signal input for determining the point at which a defrost control signal should be applied to the heat exchangers. The main operating or modulating control signal applied to the heat pump control logic circuit 25 however is a temperature error signal supplied from a comparator circuit shown at 28 which comprises part of a thermostat unit shown by the dashed line box 29. The comparator circuit 28 has supplied to it a temperature reference signal set by manual operation of a rheostat or the like by the owner of the house or other operator of the heat pump apparatus. In addition, a sensed temperature signal is derived by a temperature sensor 31 which measures the actual house temperature at a particular point after integrating heating/cooling losses incurred by the house air ducting and other house thermal constants. The comparator circuit 28 compares the sensed actual temperature of the house with the reference temperature and derives an output house temperature error signal representative of any difference between the two and the polarity of the difference. The heat pump control logic circuit 25 then processes the error signal and supplies appropriate output controlling signals to the RPC and/or heat exchangers and fans 26 to cause the heat pump to reduce the temperature error signal towards zero.

In addition to the above-noted features, a manually operated heat/cool switch and an automatic/manual switch shown at 32 are provided on the thermostat and as is known in the art in order to cause the heat pump control logic circuit 25 to appropriately actuate the reversing valve of the heat exchangers to cause the heat pump unit to either heat or cool as required by the setting of the heat/cool switch. The setting of the automatic/manual switch determines whether the heat pump will operate in the automatic heating/cooling mode during either a heating or cooling cycle as set by the heat/cool switch or whether the heat exchanger and RPC will be deenergized and only the circulating fan caused to operate for circulating air through the house as is well known in conventional home heat pump unit installations.

As noted earlier the RPC heat pump unit is defined as a load-following (or modulating) heat pump. By this is meant that the output heating or cooling capacity of the heat pump employing the RPC is varied in a continuous manner so that its output capacity matches the actual load requirement. For example, if the load is a single-family residence where the heating or cooling requirement varies as a function of outdoor weather conditions, the heating or cooling capacity of the heat pump will be automatically and smoothly varied (modulated) to maintain the temperature of the house at the thermostat reference temperature setting. As a consequence of its load following operating characteristics, the RPC heat pump operates more or less continuously to maintain the residence at the desired temperature setting. This is in sharp contrast to the on-off cycling mode of operation utilized by most currently available (non-modulating) heat pumps.

Figure 2:
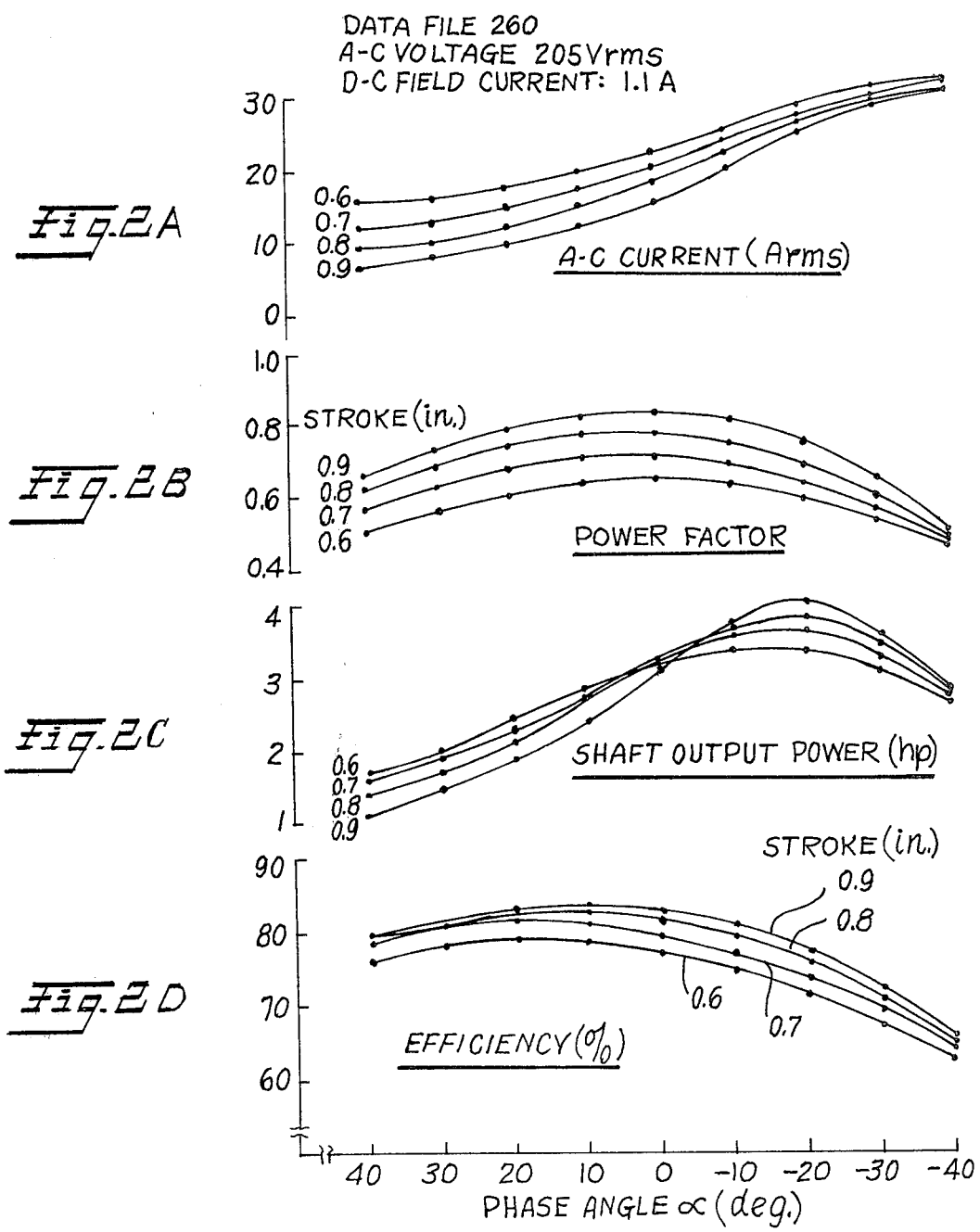
FIGS. 2 (A) through (D) are a series of curves in which the linear reciprocating motor current (2A), power factor (FIG. 2B), shaft output power in horsepower (FIG. 2C) and efficiency (FIG. 2D) are plotted against phase angle $\alpha$ in degrees as the abcissa and the above-listed operating parameters plotted as the ordinate in the respective figures noted.

The shaft output power of the reciprocating linear motor 11, as well as the motor AC current, power factor and efficiency are shown in FIGS. 2C, 2A, 2B and 2D, respectively. These characteristics are shown as a function of the stroke length in inches and the phase angle $\alpha$. By regulation of the stiffness of the gas-spring cylinder volumes in a controlled manner, the resonant tuning of the RPC relative to the electrical frequency supplied to the linear motor, can be changed. This causes the piston stroke and hence output capacity of the compressor to change as shown in FIG. 2C and the $\alpha$ angle also changes. As shown in FIG. 2A, the AC current for any given stroke increases with changes in phase angle $\alpha$ going from $+40°$ to $-40°$. As shown in FIG. 2B, for any given stroke, the power factor increases to a maximum value at essentially zero $\alpha$ angle (resonance) and thereafter decreases to the maximum leading $\alpha$ angle $-40°$. The shaft output horsepower continuously increases from about $+40°$ leading $\alpha$ angle to a $-20°$ $\alpha$ angle. Finally, the efficiency shown in FIG. 2D is substantially constant for leading $\alpha$ angles to resonance and thereafter drops off for lagging $\alpha$ angles from $0°$ to $-40°$.

Figure 3:
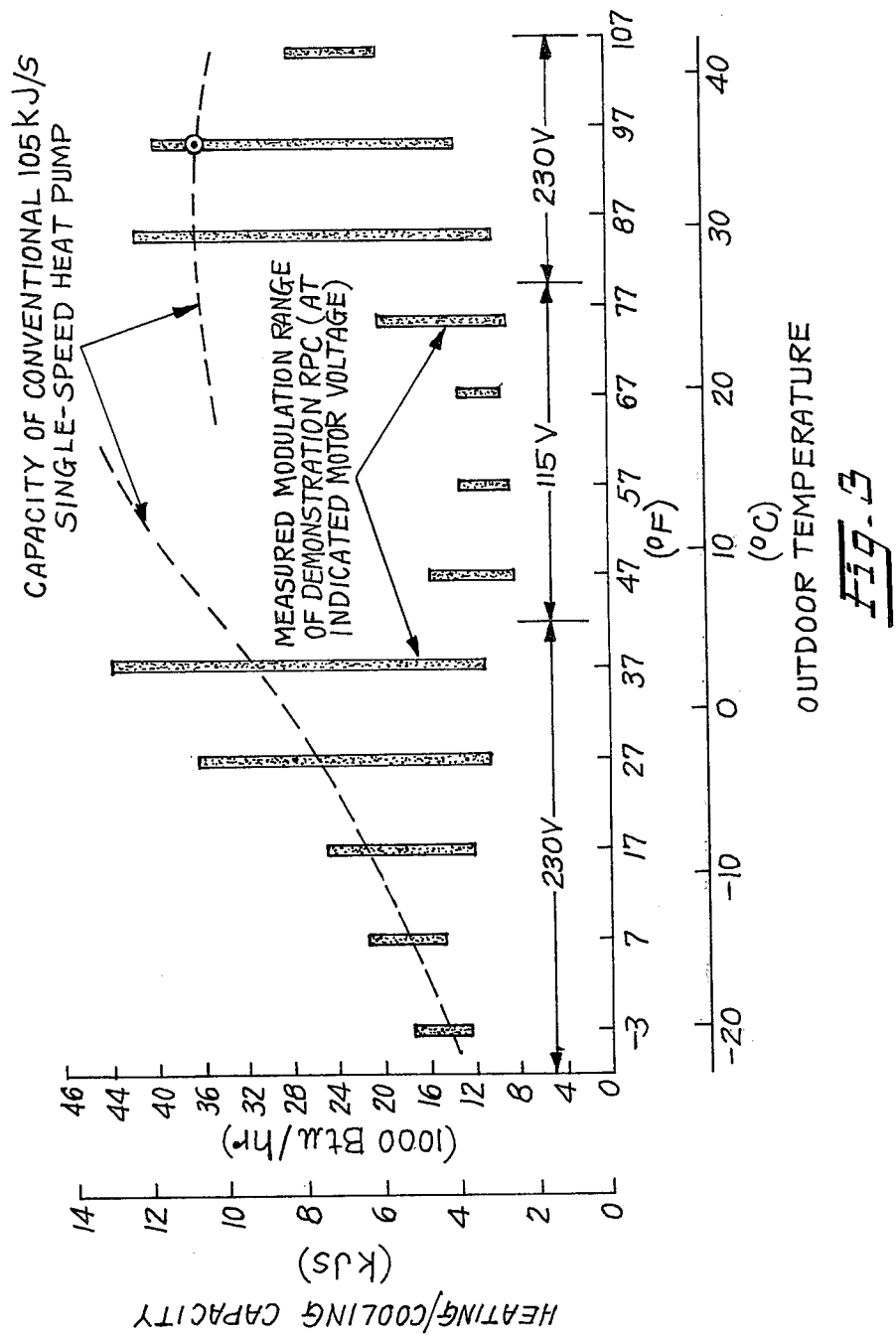
FIG. 3 is an operating characteristic curve for a 10.5 KJ/s single speed RPC heat pump employing the control system of the invention and illustrating the measured modulation capability of the RPC heat pump by plotting the heating/cooling capacity of the RPC heat pump as the ordinate versus outdoor temperature both in degrees C. and degrees F. as the abcissa.

As described earlier, output power from the linear reciprocating motor 11 can be varied in two ways: (1) by changing the AC voltage magnitude applied to the motor, and (2) by regulating the pressure in the gas spring means and thus the gas spring stiffness. Both methods of power control are used in the RPC control system by this invention as best seen in FIG. 3 of the drawings. Referring to FIG. 3, it will be seen that the AC voltage magnitude is switched between 115 volts or 230 volts rms value depending upon whether a low or high power operation is required for the conditions being met. Switching between these higher and lower values is effected so as to maintain the $\alpha$ angle within the range of $-40°$ and $+40°$. For example, at $\alpha=+40°$ the motor voltage would be set to 115 volts, if it is not already at that value. At $\alpha=-40°$ the motor voltage relay means would cause the voltage to be switched to the higher, 230 volt, value. An alarm would be activated if the motor voltage is at 230 volts and $\alpha$ remains at $-40°$ or less and the heat pump does not supply the conditioned space temperature requirement.

FIG. 3 of the drawings illustrates the measured broad range modulation capability of a 10.5 KJ/s RPC heat pump operated by a control system in accordance with this invention, and demonstrates the capability of the RPC heat pump system in terms of equivalent heating and cooling capacity as a function of outdoor temperature plotted both in degrees Fahrenheit and degrees Centigrade. Also shown is the capacity characteristics of a conventional, comparable, on-off type 10.5 KJ/s constant displacement heat pump over the same temperature range. From a consideration of FIG. 3 it will be appreciated that the modulation range of the RPC heat pump is almost ideal in the cooling region of about 75° F. (25° C.) to 107° F. (42° C.). The important point shown in FIG. 3 is the ability of the RPC heat pump to operate at much lower capacity levels than conventional heat pumps in the range of $-8°$ to 35° C. (17° to 95° F.), and particularly between $-3°$ and 29° C. (27° to 85° F.) which encompasses most of the heating and cooling range for residence on a yearly basis. Within this range of outdoor temperature values, a conventional, on-off controlled heat pump will accumulate many on-off cycles and, while running, will require higher-than-ideal compression work (per pound of refrigerant flow) because of the higher heat exchanger pressure drops associated with the higher-than-ideal flow rates. The RPC heat pump, on the other hand, will be running with far fewer on-off cycles, and will require only minimum work per pound of refrigerant flow because of its much lower load-matching flow rates. This feature of the RPC heat pump provides for significant lower annual operating costs for residential heating/cooling installations.

From the foregoing description it will be appreciated that the present invention provides a new and improved control system for a resonant free-piston, variable stroke compressor and for a heat pump utilizing such compressor. The new and improved control system controls automatically the stroke modulation of a mechanical, resonant free-piston compressor driven by an electrodynamic linear reciprocating motor wherein the spring-mass system of the resonant free piston is forced into vibration by the linear motor and is designed to have a selectively variable mechanical resonant frequency generally centered on the power line frequency of the AC power source used to drive the linear motor. The resonant piston compressor includes means which are operative to vary the natural frequency of the spring-mass system by varying the stiffness of the resilient gas springs of the RPC. The RPC control is suitable for incorporation in overall heat pump apparatus control systems for varying output power of the RPC by changing the magnitude of the AC voltage supplied to the linear motor. Both methods of power control are used to provide continuous modulation of the RPC output power as opposed to conventional on-off type control employed in currently available heat pump and like apparatus.

Having described one preferred embodiment of a control system for resonant free piston variable stroke compressors for load-following electric heat pumps and the like, many modifications, alterations and changes will occur to those skilled in the art in the light of the above teachings. It is therefore to be understood that all such modifications and changes are believed to embody the true spirit and scope of the invention as defined by the appended claims.

What is claimed is:

1. A resonant piston compressor control system for use in controlling automatically the operation of a resonant piston compressor of the mechanically resonant free-piston type driven by an electrodynamic linear motor wherein the spring-mass resonant piston system of the compressor is forced into vibration by the linear motor and is arranged to have a selectively variable mechanical resonant frequency generally centered on the power line frequency of the alternating current power source supplying the linear reciprocating motor, the resonant frequency of the spring-mass resonant piston system being varied by varying the stiffness of enclosed volumes of gas comprising resilient gas spring means that communicate with a reservoir of gas at higher pressure than the gas spring means, means selectively interconnecting the resilient gas spring means with a gas spring pressure control manifold and a gas spring pressure control valve means that can be selectively opened and closed to regulate the pressure of the gas in the gas spring pressure control manifold and the stiffness of the resilient gas spring means; said control system comprising control circuit means including alternating current sensing means for deriving a sensed alternating current signal representative of the phase and magnitude of the alternating current supplied to the linear reciprocating motor, resonant piston displacement/velocity sensing means for deriving a stroke signal representative of the resonant piston velocity, $\alpha$ angle detector means responsive to the output from said alternating current sensing means and said resonant piston displacement/velocity sensing means for comprising the phase of the alternating current supplied to the linear reciprocating motor and the resonant piston velocity and deriving an output $\alpha$ angle control signal for controlling the voltage value of the alternating current supply voltage to the linear reciprocating motor for controlling the output capacity of the compressor.

2. A control system according to claim 1 further comprising resonant piston compressor control logic circuit means responsive to the $\alpha$ angle control signal derived by said $\alpha$ angle detector means and also responsive to a number of additional resonant piston compressor operating parameter sensing means and input control signal means for logically processing said $\alpha$ angle control signal together with the other sensed operating parameter signals derived by said additional operating parameter sensing means and an input control reference signal for overall controlling both the gas spring control valve means in response to the input control signal and the linear reciprocating motor voltage in response to the $\alpha$ angle control signal and responding to logically devised highest priority error, alarm or limit controlling signals.

3. A control system according to claim 2 wherein said linear reciprocating electrodynamic motor includes alternating current winding means and direct current field winding means and said control circuit means further includes alternating current voltage control means for controlling the magnitude of the alternating current voltage supplied to the alternating current winding means, alternating current detector means responsive to the output from said alternating current sensing means for deriving an output signal representative of the magnitude of the alternating current, the output from said alternating current detector circuit means being supplied to said resonant piston compressor control logic circuit means, and direct current control and supply circuit means having its output supplied to the direct current field winding means of the reciprocating linear motor and controlled by an output direct current control signal derived from said resonant piston compressor control logic circuit means for proportionally controlling the magnitude of the direct current supplied to said linear reciprocating motor direct current field winding means in proportion to the current magnitude of the alternating current supplied to the alternating current winding means of the linear reciprocating motor.

4. A control system according to claim 3 wherein said control circuit means further includes two level voltage supply relay circuit means for controlling the magnitude of the supply alternating current/voltage to said linear reciprocating motor, said motor voltage relay circuit means being controlled by the resonant piston compressor control logic circuit means in response to the input from the $\alpha$ angle detector means whereby the magnitude of the alternating current supply voltage to the linear reciprocating motor is switched from a lower to a higher voltage value upon the $\alpha$ angle attaining a predetermined negative (lagging) value and for switching the alternating current voltage to the linear reciprocating motor to a lower voltage value in response to the $\alpha$ angle attaining a predetermined positive (leading) value relative to the alternating current supply voltage frequency.

5. A control system according to claim 4 further including two level stroke limit detector circuit means responsive to the output from said resonant piston displacement/velocity sensing means for comparing the resonant piston velocity to predetermined alarm and trip-out level magnitudes, the output from said two level stroke limits detector circuit means being supplied to said resonant piston compressor control logic circuit means for cutting back operation of the resonant piston compressor and/or shutting down operation of the resonant piston compressor under conditions where the piston stroke magnitude attains a level which could result in damage to the compressor.

6. A control system according to claim 5 further including motor temperature sensing means for sensing the temperature of the linear reciprocating motor and deriving an output sensed temperature signal representative of the temperature value and motor temperature detector circuit means responsive to the output motor temperature signal for comparing the sensed motor temperature to a predetermined safe temperature limit and thereafter deriving an output motor temperature alarm signal for supply to said resonant piston compressor control logic circuit means to cause said resonant piston compressor control logic circuit means to cut back and/or shut down the compressor in the event that the motor temperature exceeds a predetermined safe limit value.

7. A control system according to claim 6 wherein said resonant piston compressor is part of a larger overall apparatus for performing a predetermined design function and the larger overall apparatus includes a central apparatus controller for supplying to the resonant piston control logic circuit means an input demand control reference signal for controlling operation of the resonant piston compressor in response to the requirements of the apparatus.

8. A control system according to claim 7 wherein the apparatus comprises a heat pump unit including heat exchanger means for dispensing heated/cooled air for maintaining the temperature of a climate controlled space within desired values, said heat exchange means being supplied with working fluid from the resonant piston compressor along with outside air to be heated/cooled, the central controller of the apparatus comprises RPC and heat pump control logic cirucit means for supplying operating control signals to the heat exchanger means and other heat pump components, thermostat means including means for providing a temperature reference signal representative of a desired temperature at which the space being heated/cooled is to be maintained, temperature sensing means for sensing the temperature of the space and deriving an output sensed space temperature signal representative of the temperature of the space, temperature control signal deriving means responsive to the temperature reference signal and the sensed space temperature signal for deriving an output temperature error control signal that is supplied to the heat pump control logic circuit means, said heat pump control logic circuit means deriving a load demand control reference signal for supply to the resonant piston control logic circuit means for coordinating operation of said resonant piston compressor with the operation of the heat pump heat exchanger and other components whereby the resonant piston compressor operates as a load demand following system for supplying the heating/cooling load demand of the heat pump unit under almost all operating conditions except where response to such demand would endanger the resonant piston compressor in which event operation of the resonant piston is maintained within safe limits at all times.

* * * * *